US012764459B2

(12) United States Patent
Usami et al.

(10) Patent No.: US 12,764,459 B2
(45) Date of Patent: Oct. 13, 2026

(54) SOUND REPRODUCTION METHOD, SOUND REPRODUCTION DEVICE, AND RECORDING MEDIUM

(71) Applicant: Panasonic Intellectual Property Corporation of America, Torrance, CA (US)

(72) Inventors: Hikaru Usami, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 105 days.

(21) Appl. No.: 18/373,484

(22) Filed: Sep. 27, 2023

(65) Prior Publication Data

US 2024/0022854 A1 Jan. 18, 2024

Related U.S. Application Data

(63) Continuation of application No. PCT/JP2022/015445, filed on Mar. 29, 2022.

(Continued)

(30) Foreign Application Priority Data

Feb. 18, 2022 (JP) ................................ 2022-024143

(51) Int. Cl.
*H04R 1/34* (2006.01)
*H04R 3/04* (2006.01)

(52) U.S. Cl.
CPC ............... *H04R 1/345* (2013.01); *H04R 3/04* (2013.01)

(58) Field of Classification Search
CPC ................................. H04R 3/04; H04R 1/345
See application file for complete search history.

(56) References Cited

U.S. PATENT DOCUMENTS 7,917,236 B1 * 3/2011 Yamada .................. H04S 1/007 381/310

FOREIGN PATENT DOCUMENTS

JP 2005-80124 3/2005
JP 2005-208166 8/2005

(Continued)

OTHER PUBLICATIONS

International Search Report (ISR) issued on Jun. 28, 2022 in International (PCT) Application No. PCT/JP2022/015445.

(Continued)

*Primary Examiner* — Devona E Faulk
(74) *Attorney, Agent, or Firm* — Wenderoth, Lind & Ponack, L.L.P.

(57) ABSTRACT

A sound reproduction method includes: obtaining spatial information for reproducing a virtual space which includes a structure and a sound source; identifying a listening position in the virtual space; generating one or more virtual sound sources for reproducing diffraction of sound emitted from the sound source, the one or more virtual sound sources being disposed in a neighborhood of one or more virtual sound source directions; and determining the one or more virtual sound sources based on a length of a propagation path of the sound from the sound source to a listener, the propagation path bypassing the structure. The determining includes determining at least one of (i) a sound pressure level of sound from the one or more virtual sound source directions, (ii) a total number of the one or more virtual sound sources, or (iii) a frequency characteristic of sound from the one or more virtual sound sources.

15 Claims, 9 Drawing Sheets

Related U.S. Application Data

(60) Provisional application No. 63/173,637, filed on Apr. 12, 2021.

(56) References Cited

FOREIGN PATENT DOCUMENTS

| | | | | | | |
|---|---|---|---|---|---|---|
| JP | 2013-201577 | | | 10/2013 | | |
| JP | 2013201577 | A | * | 10/2013 | ............. | H04S 7/302 |
| WO | 2018/226385 | | | 12/2018 | | |
| WO | WO-2018226385 | A2 | * | 12/2018 | ............. | H04S 7/303 |
| WO | 2019/066348 | | | 4/2019 | | |
| WO | 2020/030304 | | | 2/2020 | | |

OTHER PUBLICATIONS

Extended European Search Report issued Aug. 27, 2024 in corresponding European Patent Application No. 22788027.5.

* cited by examiner

SOUND REPRODUCTION METHOD, SOUND REPRODUCTION DEVICE, AND RECORDING MEDIUM

CROSS REFERENCE TO RELATED APPLICATIONS

This is a continuation application of PCT International Application No. PCT/JP2022/015445 filed on Mar. 29, 2022, designating the United States of America, which is based on and claims priority of U.S. Provisional Patent Application No. 63/173,637 filed on Apr. 12, 2021, and Japanese Patent Application No. 2022-024143 filed on Feb. 18, 2022. The entire disclosures of the above-identified applications, including the specifications, drawings and claims are incorporated herein by reference in their entirety.

FIELD

The present disclosure relates to a sound reproduction method, a sound reproduction device, and a recording medium for reproducing three-dimensional (3D) audio.

BACKGROUND

Patent Literature (PTL) 1 discloses a sound simulation device which identifies the propagation path of sound in real time and performs signal processing for sound effects such as reflection, diffraction, and localization according to the propagation path.

CITATION LIST

Patent Literature

PTL 1: Japanese Unexamined Patent Application Publication No. 2005-208166

SUMMARY

Technical Problem

However, in the 3D audio reproduction, a predetermined processing load is required to calculate the sound parameters of the reproduction space. In particular, a large processing load is required to reproduce sound diffraction on a sound propagation path from the sound source to the listener in a reproduction space with a complicated spatial structure or in a reproduction space which includes an obstacle. In addition, when the position of the sound source, the position of the listener, the spatial structure of the reproduction space, and the like change, it is necessary to perform calculations according to the changed position of the sound source, the changed position of the listener, and the changed spatial structure of the reproduction space. Hence, a large processing load is required.

In view of the above, the present disclosure provides a sound reproduction method and the like which is capable of reducing the processing load required for reproducing 3D audio.

Solution to Problem

A sound reproduction method according to one aspect of the present disclosure incudes: obtaining spatial information including information about each of a structure and a sound source disposed in a virtual space; identifying a listening position of a listener in the virtual space; determining, when the structure is disposed between the sound source and the listening position in the virtual space, at least one of (i) a sound pressure level of sound to be heard by the listener from each of one or more virtual sound source directions, (ii) a total number of one or more virtual sound sources, or (iii) a frequency characteristic of sound emitted from the one or more virtual sound sources, based on a length of a propagation path bypassing the structure, the propagation path being a propagation path of the sound from the sound source to the listener; and generating the one or more virtual sound sources for reproducing diffraction of sound from the sound source, the one or more virtual sound sources being disposed in a neighborhood of the one or more virtual sound source directions from the listening position toward one or more ends of the structure.

A sound reproduction device according to one aspect of the present disclosure includes: an obtainer which obtains spatial information including information about each of a structure and a sound source disposed in a virtual space; an identifier which identifies a listening position of a listener in the virtual space; and a generator which determines, when the structure is disposed between the sound source and the listening position in the virtual space, at least one of (i) a sound pressure level of sound to be heard by the listener from each of one or more virtual sound source directions, (ii) a total number of one or more virtual sound sources, or (iii) a frequency characteristic of sound emitted from the one or more virtual sound sources, based on a length of a propagation path bypassing the structure, the propagation path being a propagation path of the sound from the sound source to the listener, and generates the one or more virtual sound sources for reproducing diffraction of sound from the sound source, the one or more virtual sound sources being disposed in a neighborhood of the one or more virtual sound source directions from the listening position toward one or more ends of the structure.

General and specific aspects disclosed above may be implemented using a system, a method, an integrated circuit, a computer program, a computer-readable recording medium such as a CD-ROM, or any combination of systems, methods, integrated circuits, computer programs, or recording media.

Advantageous Effects

The sound reproduction method and the like according to the present disclosure is capable of reducing the processing load required for reproducing 3D audio.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
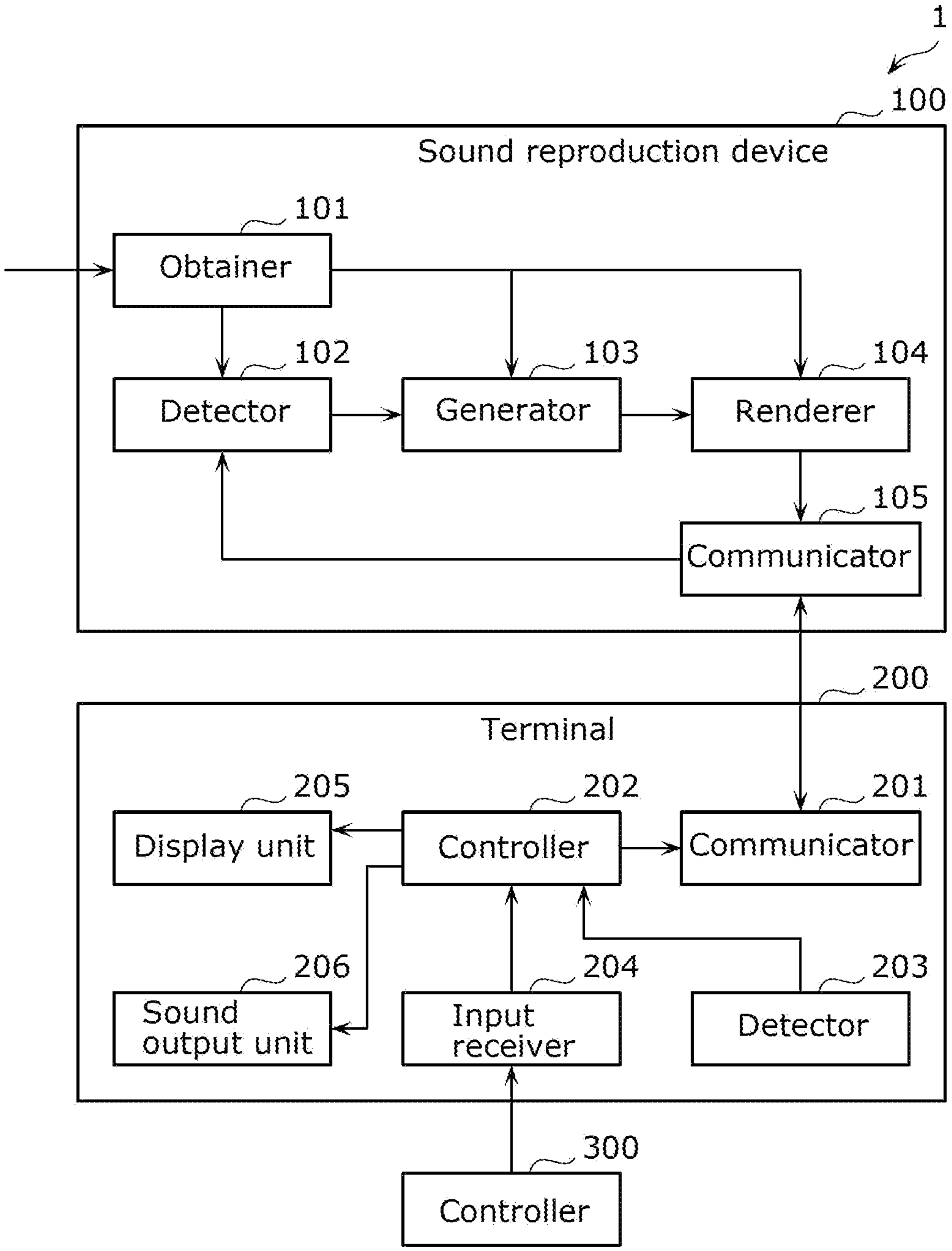
FIG. 1 illustrates an example of a sound reproduction system according to an embodiment.

A sound reproduction method according to one aspect of the present disclosure includes: obtaining spatial information for reproducing a virtual space which includes a structure and a sound source; identifying a listening position of a listener in the virtual space; and generating one or more virtual sound sources for reproducing diffraction of sound from the sound source when the structure is disposed between the sound source and the listening position in the virtual space, the one or more virtual sound sources being disposed in a neighborhood of one or more virtual sound source directions from the listening position toward one or more ends of the structure. The generating includes determining the one or more virtual sound sources based on a length of a propagation path of the sound from the sound source to the listener, the propagation path bypassing the structure, and the determining includes determining at least one of (i) a sound pressure level of sound heard by the listener from the one or more virtual sound source directions, (ii) a total number of the one or more virtual sound sources, or (iii) a frequency characteristic of sound emitted from the one or more virtual sound sources.

With this, one or more virtual sound sources, for which the sound pressure level, the number of virtual sound sources to be generated, and the frequency characteristics are determined, are generated based on the length of each propagation path, so that the sound heard by the listener when a structure is disposed between the sound source and the listener in the virtual space is reproduced. Accordingly, it is possible to reduce the processing load required for reproducing 3D audio.

Moreover, it may be that the sound pressure level is determined by adjusting a sound pressure level of the sound emitted from the one or more virtual sound sources to decrease as the length of the propagation path increases.

With this, one or more virtual sound sources can be generated such that the sound pressure level of the sound is attenuated as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, it may be that the sound pressure level is determined by adjusting a position of each of the one or more virtual sound sources to be further away from the listening position as the length of the propagation path increases.

With this, it is possible to generate one or more virtual sound sources for which the sound pressure level is determined according to the length of the propagation path. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

It may be that the total number of the one or more virtual sound sources is determined to increase as the length of the propagation path increases.

With this, it is possible to generate one or more virtual sound sources determined such that the sound spreads more due to the influence of diffraction as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

It may be that the frequency characteristic is determined to set a sound pressure level in a high frequency range to be relatively lower than a sound pressure level in a low frequency range as the length of the propagation path increases.

With this, it is possible to generate one or more virtual sound sources which are determined to reproduce the phenomenon where the sound pressure level in the high frequency range decreases due to the influence of diffraction as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, it may be that the frequency characteristic is adjusted to increase a bandwidth of the high frequency range in which the sound pressure level is set to be relatively lower than the sound pressure level in the low frequency range, as the length of the propagation path increases.

With this, it is possible to generate one or more virtual sound sources for which the frequency characteristics are determined according to the length of the propagation path. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, it may be that when two propagation paths, each of which is the propagation path, are formed with the structure interposed therebetween, the one or more virtual sound sources are disposed in each of two virtual sound source directions corresponding to the two propagation paths.

With this, since one or more virtual sound sources are disposed for each of two propagation paths, it is possible to reproduce appropriate 3D audio which hardly affects the impressions of the sound heard by the listener before and after a plurality of virtual sound sources are disposed in place of the sound source.

Moreover, it may be that when a single propagation path, which is the propagation path, is formed passing only on one side of the structure, the one or more virtual sound sources are disposed only in a single virtual sound source direction corresponding to the single propagation path, and the one or more virtual sound sources are plural in number.

With this, since a plurality of virtual sound sources are disposed for a single propagation path, it is possible to reproduce appropriate 3D audio which hardly affects the impressions of the sound heard by the listener before and after a plurality of virtual sound sources are disposed in place of the sound source.

Moreover, a sound reproduction device according to one aspect of the present disclosure includes: an obtainer which obtains spatial information for reproducing a virtual space which includes a structure and a sound source; an identifier which identifies a listening position of a listener in the virtual space; and a generator which generates one or more virtual sound sources for reproducing diffraction of sound from the sound source when the structure is disposed between the sound source and the listening position in the virtual space, the one or more virtual sound sources being disposed in a neighborhood of one or more virtual sound source directions from the listening position toward one or more ends of the structure. The one or more virtual sound sources are determined based on a length of a propagation path of the sound from the sound source to the listener, the propagation path bypassing the structure, and when the one or more virtual sound sources are determined, at least one of (i) a sound pressure level of sound heard by the listener from the one or more virtual sound source directions, (ii) a total number of the one or more virtual sound sources, or (iii) a frequency characteristic of sound emitted from the one or more virtual sound sources is determined.

With this, one or more virtual sound sources, for which the sound pressure level, the number of virtual sound sources to be generated, and the frequency characteristics are determined, are generated based on the length of each propagation path, so that the sound heard by the listener when a structure is disposed between the sound source and the listener in the virtual space is reproduced. Accordingly, it is possible to reduce the processing load required for reproducing the 3D audio.

General and specific aspects disclosed above may be implemented using a system, a method, an integrated circuit, a computer program, a computer-readable recording medium such as a CD-ROM, or any combination of systems, methods, integrated circuits, computer programs, or recording media.

Hereinafter, an embodiment will be described with reference to the drawings. It should be noted that the embodiment described below shows a specific example of the present disclosure. In other words, the numerical values, shapes, materials, structural elements, the arrangement and connection of the structural elements, steps, the processing order of steps, etc., illustrated in the following embodiment are mere examples, and therefore do not limit the present disclosure. Moreover, among the structural elements in the following embodiments, those not recited in any of the independent claims defining the most generic part of the inventive concept are not necessarily necessary for achieving the object of the present disclosure, but are described as structural elements belonging to a more preferred embodiment.

EMBODIMENT

1. Configuration

First, a system configuration according to the present disclosure will be described.

FIG. 1 illustrates an example of a sound reproduction system according to an embodiment.

As illustrated in FIG. 1, sound reproduction system 1 according to the present embodiment includes, for example, sound reproduction device 100, terminal 200, and controller 300. For example, these elements may be communicatively connected to one another by dedicated wired communication, or may be communicatively connected to one another by wireless communication. These elements may be connected to one another such that direct communication can be performed or communication can be performed via a predetermined device interposed therebetween. Sound reproduction device 100 reproduces sound in a virtual space and outputs the sound to terminal 200. Sound reproduction device 100 reproduces the virtual space, and reproduces the sound heard by the user in the virtual space. The virtual space includes, for example, a structure, a sound source, and a listener. The listener is the user. These structure, sound source and listener are virtual. Sound reproduction device 100 reproduces the sound heard by the listener in the virtual space, based on the size and position of the structure, the position of the sound source, and the position of the listener in the virtual space. Terminal 200 outputs the generated sound to the user, and obtains, from controller 300, the input received by controller 300 from the user. The position and posture of the listener in the virtual space are changed according to the input obtained by terminal 200. Accordingly, sound reproduction device 100 changes the sound to be reproduced, according to the position and the posture of the listener in the virtual space which have been changed according to the input obtained by terminal 200.

First, sound reproduction device 100 will be described.

Sound reproduction device 100 includes obtainer 101, detector 102, generator 103, renderer 104, and communicator 105. Sound reproduction device 100 can be realized by a processor executing a predetermined program using memory. In other words, sound reproduction device 100 is a computer.

Obtainer 101 obtains sound information for reproducing sound in a virtual space. Obtainer 101 may obtain sound information from an external storage device via a network, or may obtain sound information from an internal storage device. The storage device may be a device which reads information recorded on a recording medium, such as an optical disk or memory card, or may be a device which incorporates a recording medium, such as hard disk drive (HDD) or solid state drive (SSD), and reads information recorded on the recording medium. The external storage device may be, for example, a server connected via the Internet. The sound information includes, for example, an audio stream indicating sound from a sound source and spatial information indicating a virtual space.

Detector 102 detects one or more obstacles in the virtual space based on the spatial information included in the sound information. The spatial information includes, for example, mesh information for reproducing a structure placed in a virtual space and a sound source position. The mesh information includes information such as the size, shape, and colors of the structure. Examples of the structure include an artificial structure and a natural structure. In other words, the structure includes any virtual objects for defining the space. The sound source position indicates the position where the sound is reproduced (output) in the structure. Detector 102 identifies the listening position of the listener in the virtual space, based on the listener information received by communicator 105. Detector 102 is an example of an identifier. Detector 102 determines whether a structure is disposed between the sound source position and the listening position based on the size, shape and position of the structure, the sound source position, and the listening position. When detector 102 determines that a structure is disposed between the sound source position and the listening position, detector 102 detects the structure as an obstacle.

When a structure is disposed between the sound source and the listening position in the virtual space, that is, when an obstacle is detected by detector 102, generator 103 generates one or more virtual sound sources that are disposed in the neighborhood of (on or in the vicinity of) one or more virtual sound source directions from the listening position to one or more ends of the structure. The virtual sound source directions each are the direction in which a straight line passing through the listening position and an end of the structure extends. The one or more virtual sound sources are sound sources for reproducing diffraction of sound from the sound source. The one or more ends of the structure detected as an obstacle are ends of the structure in a predetermined direction when the structure is viewed from the listening position. The one or more ends of the structure detected as an obstacle may include, for example, both horizontal ends of the structure when the structure is viewed from the listening position. Alternatively, the one or more ends of the structure may, for example, include only one horizontal end of the structure when the structure is viewed from the listening position. The case where only one end is included may be the case where a second end of the structure, which is opposite to a first end of the structure that is the one horizontal end of the structure, is located further from the first end of the structure than a second end of the field of view of the listener that is on the same side as the second end of the structure. In addition, the case where only one end is included may be the case where the structure is also located on a second side of the sound source which is on the same side as the second end of the structure.

Renderer 104 generates an audio stream for output using head-related transfer functions according to the one or more virtual sound sources generated by generator 103 and the listening position of the listener and the posture of the listener. Renderer 104 also generates a video stream indicating the field of view of the listener at the posture of the listener from the listening position of the listener. The video stream is a video of a structure in the virtual space included in the field of view.

Communicator 105 exchanges information with terminal 200 by performing communication with terminal 200. Communicator 105, for example, transmits an audio stream and a video stream for output to terminal 200. Communicator 105 also receives, from terminal 200, listener information indicating, for example, the listening position of the listener and the posture of the listener.

Next, terminal 200 will be described.

Terminal 200 includes communicator 201, controller 202, detector 203, input receiver 204, display unit 205, and sound output unit 206. Terminal 200 may be, for example, a virtual reality (VR) headset worn on the head of the user, or a mobile terminal, such as a smartphone, attached to a wearing device to be worn on the head of the user.

Communicator 201 exchanges information with sound reproduction device 100 by performing communication with sound reproduction device 100. Communicator 201 transmits, for example, listener information indicating the listening position of the listener and the posture of the listener to sound reproduction device 100. Communicator 105 also receives, for example, an audio stream for output and a video stream for output from sound reproduction device 100.

Of the audio stream and video stream received by communicator 201, controller 202 outputs the audio stream to sound output unit 206 and the video stream to display unit 205. Controller 202 also obtains the motion of the head of the user (that is, changes in head position and posture) detected by detector 203. Controller 202 also obtains the input received by input receiver 204. The input is an input for causing at least one of the following to occur: moving the position of the listener in the virtual space; or changing the posture of the listener. Controller 202 generates listener information indicating the listening position of the listener and the posture of the listener based on the obtained motion of the head of the user and the obtained input indicating that the position and the posture of the listener are to be changed. Controller 202 then transmits the listener information to sound reproduction device 100 via communicator 201. Controller 202 obtains the head motion and the input, and sequentially (that is, at regular time intervals) performs a process for generating listener information based on the obtained head motion and input. The regular time interval is, for example, less than one second.

Detector 203 sequentially detects the motion of the head of the user. Detector 203 detects changes in the position and posture of the head of the user. Examples of detector 203 include an acceleration sensor and an angular velocity sensor. Detector 203 is, for example, an inertial measurement unit (IMU).

Input receiver 204 receives, from controller 300 operated by the user, an input indicating that the position of the listener is to be moved or the posture of the listener is to be changed in the virtual space. Input receiver 204 may receive the input from controller 300 via wireless communication with controller 300, or may receive the input from controller 300 via wired communication. Communicator 201 may include the function of input receiver 204 to receive the input from controller 300. Input receiver 204 may include buttons, touch sensors, and the like which directly receive the input from the user.

Display unit 205 displays video (moving image) indicated by the video stream output by controller 202. The moving image is video including a plurality of frames. The video may be a still image. Display unit 205 is, for example, a liquid crystal display, or an organic electro-luminescent (EL) display.

Sound output unit 206 outputs audio (including music) indicated by the audio stream output by controller 202. Sound output unit 206 is, for example, a loudspeaker.

Controller 300 is a device which receives an input from the user and transmits the received input to terminal 200. As described above, the input is for changing at least one of the position or posture of the listener in the virtual space.

Next, a specific example of a process for generating virtual sound sources performed by sound reproduction device 100 will be described.

Figure 2:
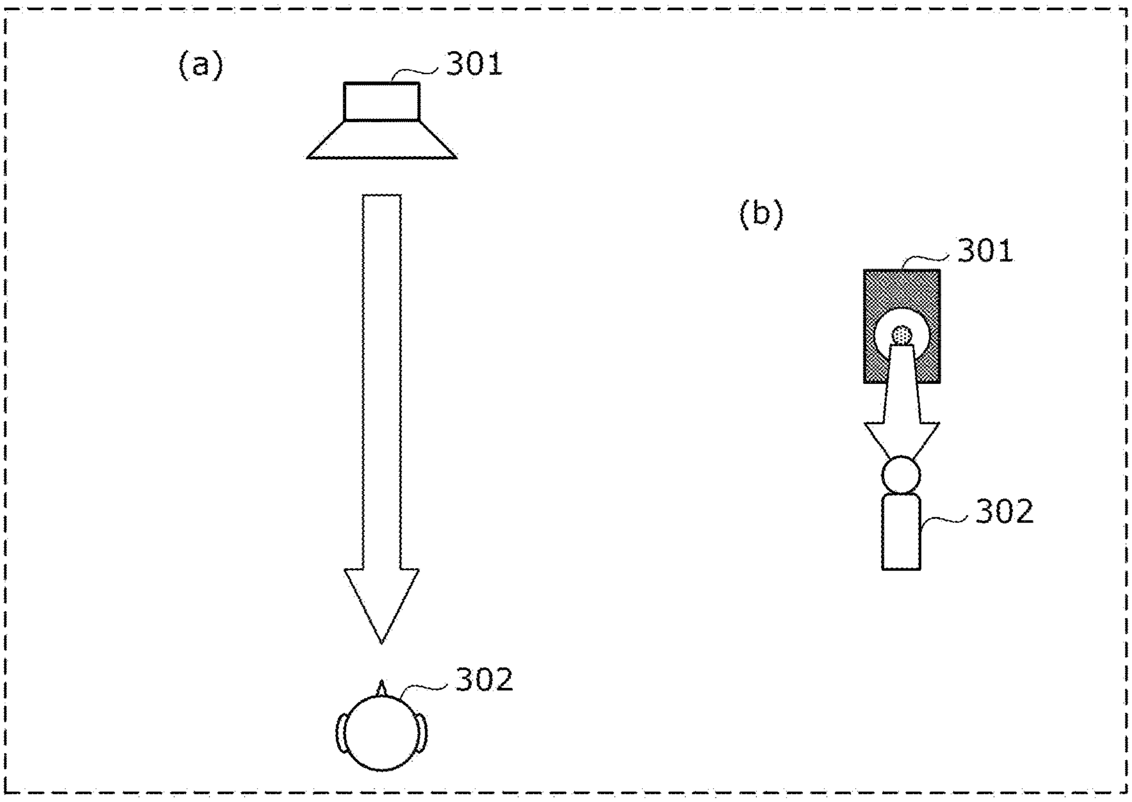
FIG. 2 is a diagram for explaining a process performed when no obstacle is disposed between a sound source and a listener.

FIG. 2 is a diagram for explaining a process performed when no obstacle is disposed between the sound source and the listener. In FIG. 2, (a) is a top plan view of a positional relationship between the sound source and the listener in the virtual space. In FIG. 2, (b) is a three-dimensional diagram illustrating the positional relationship between the sound source and the listener in the virtual space.

When no obstacle is disposed between sound source 301 and listener 302, sound reproduction device 100 generates a virtual sound source such that sound is output from the position of sound source 301 toward listener 302 as illustrated in FIG. 2. In other words, the virtual sound source generated in this case is the same as sound source 301.

Figure 3:
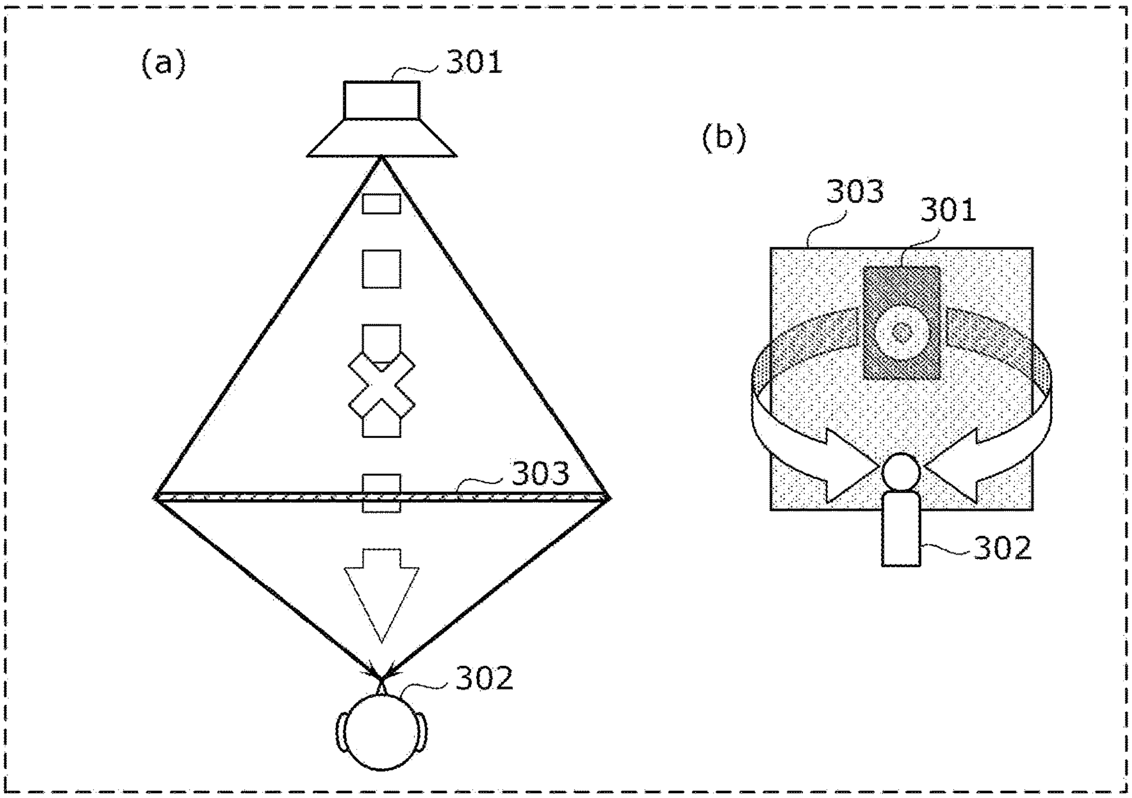
FIG. 3 is a diagram for explaining how sound is heard by the listener when an obstacle is disposed between the sound source and the listener.

FIG. 3 is a diagram for explaining how sound is heard by the listener when an obstacle is disposed between the sound source and the listener. In FIG. 3, (a) is a top plan view of a positional relationship between the sound source and the listener in the virtual space. In FIG. 3, (b) is a three-dimensional diagram illustrating the positional relationship between the sound source and the listener in the virtual space.

When obstacle 303 is disposed between sound source 301 and listener 302 as illustrated in FIG. 3, it is assumed that listener 302 hears the sound (diffracted sound) that diffracts around the sides of obstacle 303 because the sound emitted from sound source 301 is unlikely to propagate straight unlike FIG. 2. Accordingly, sound reproduction device 100 needs to reproduce the diffracted sound.

Figure 4:
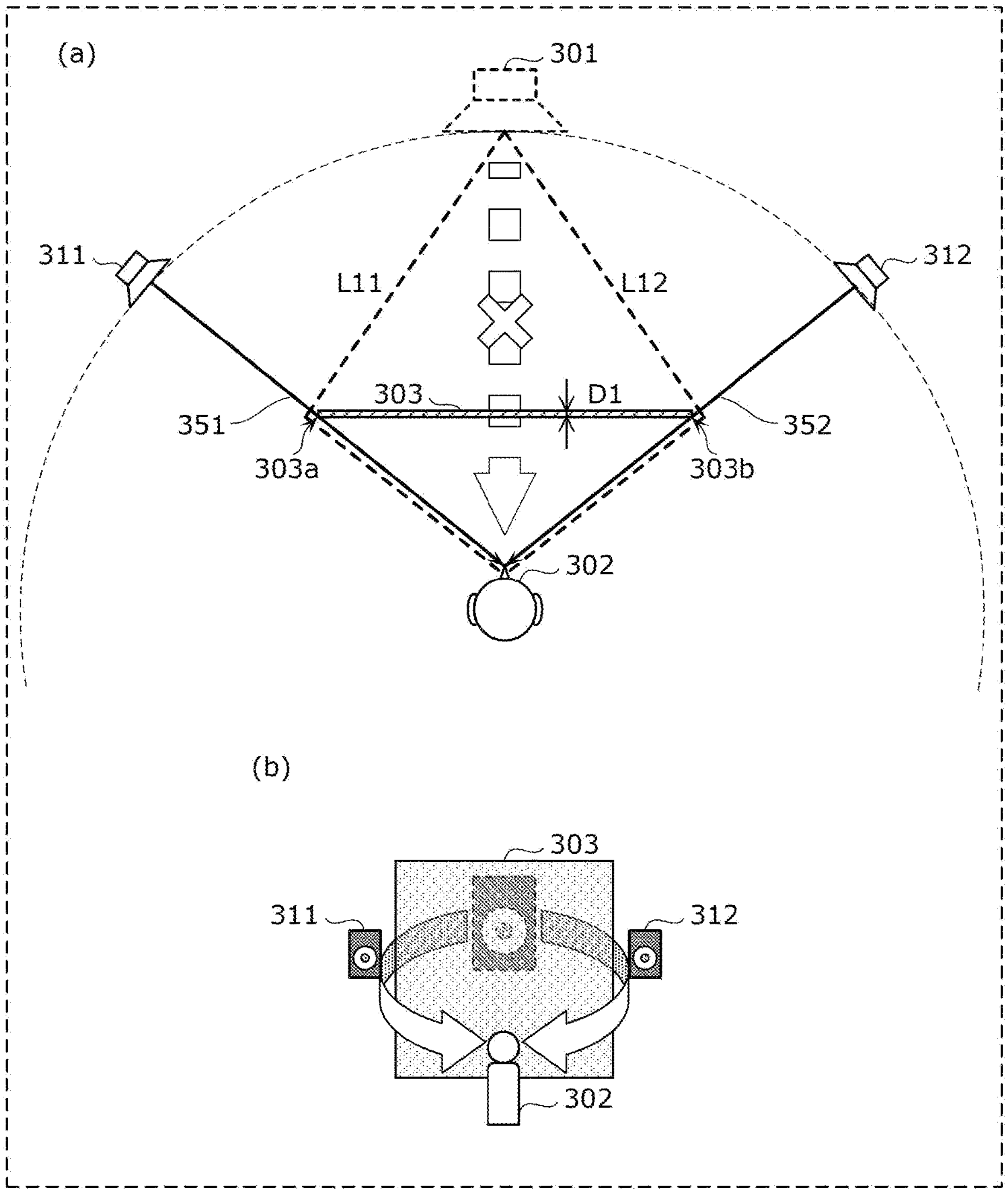
FIG. 4 is a diagram for explaining a first example of a process for generating virtual sound sources when an obstacle is disposed between the sound source and the listener.

FIG. 4 is a diagram for explaining a first example of a process for generating virtual sound sources when an obstacle is disposed between the sound source and the listener. In FIG. 4, (a) is a top plan view of a positional relationship between the sound source and the listener in the virtual space. In FIG. 4, (b) is a three-dimensional diagram illustrating the positional relationship between the sound source and the listener in the virtual space.

In order to simply reproduce the diffracted sound, as illustrated in FIG. 4, generator 103 of sound reproduction device 100 generates, in place of sound source 301, two virtual sound sources 311 and 312 that are disposed in the neighborhood of two virtual sound source directions 351 and 352 which are from the listening position of listener 302 toward both ends of obstacle 303 and correspond to both ends of obstacle 303. Virtual sound source direction 351 is a direction indicated by a straight line passing through listener 302 and horizontal first end 303*a* of obstacle 303. Virtual sound source direction 352 is a direction indicated by a straight line passing through listener 302 and horizontal second end 303*b* of obstacle 303. First end 303*a* and second end 303*b* of obstacle 303 in the horizontal direction are the same as the ends of obstacle 303 in the horizontal direction when obstacle 303 is viewed from listener 302. Since first end 303*a* and second end 303*b* are on the shortest paths along which the sound is diffracted and propagated when obstacle 303 is present, hereinafter, first end 303*a* and second end 303*b* may also be referred to as diffraction points.

In FIG. 4, (a) illustrates an example where the length of shortest propagation path L11 of the sound from sound source 301 propagating on the left side of obstacle 303 is equal to the length of shortest propagation path L12 of the sound from sound source 301 propagating on the right side of obstacle 303. Propagation paths L11 and L12 are indicated by thick dashed lines in (a) of FIG. 4. More specifically, the length from sound source 301 to first end 303*a* on propagation path L11 is equal to the length from sound source 301 to second end 303*b* on propagation path L12. In addition, the length from first end 303*a* to the listening position of listener 302 on propagation path L11 is equal to the length from second end 303*b* to the listening position of listener 302 on propagation path L12. Accordingly, virtual sound sources 311 and 312 to be generated are disposed at positions equidistant from the listening position of listener 302 (that is, positions on the circle indicated by the dashed line). Since propagation path L11 and propagation path L12 are equal to each other in length, the sound pressure levels of virtual sound sources 311 and 312 are determined to be equal to each other. When propagation path L11 and propagation path L12 are different from each other in length, the sound pressure levels of virtual sound sources 311 and 312 may be determined to be different from each other. For example, the sound pressure levels of virtual sound sources 311, 312 may be determined based on the ratio of the lengths of the propagation paths.

Figure 5:
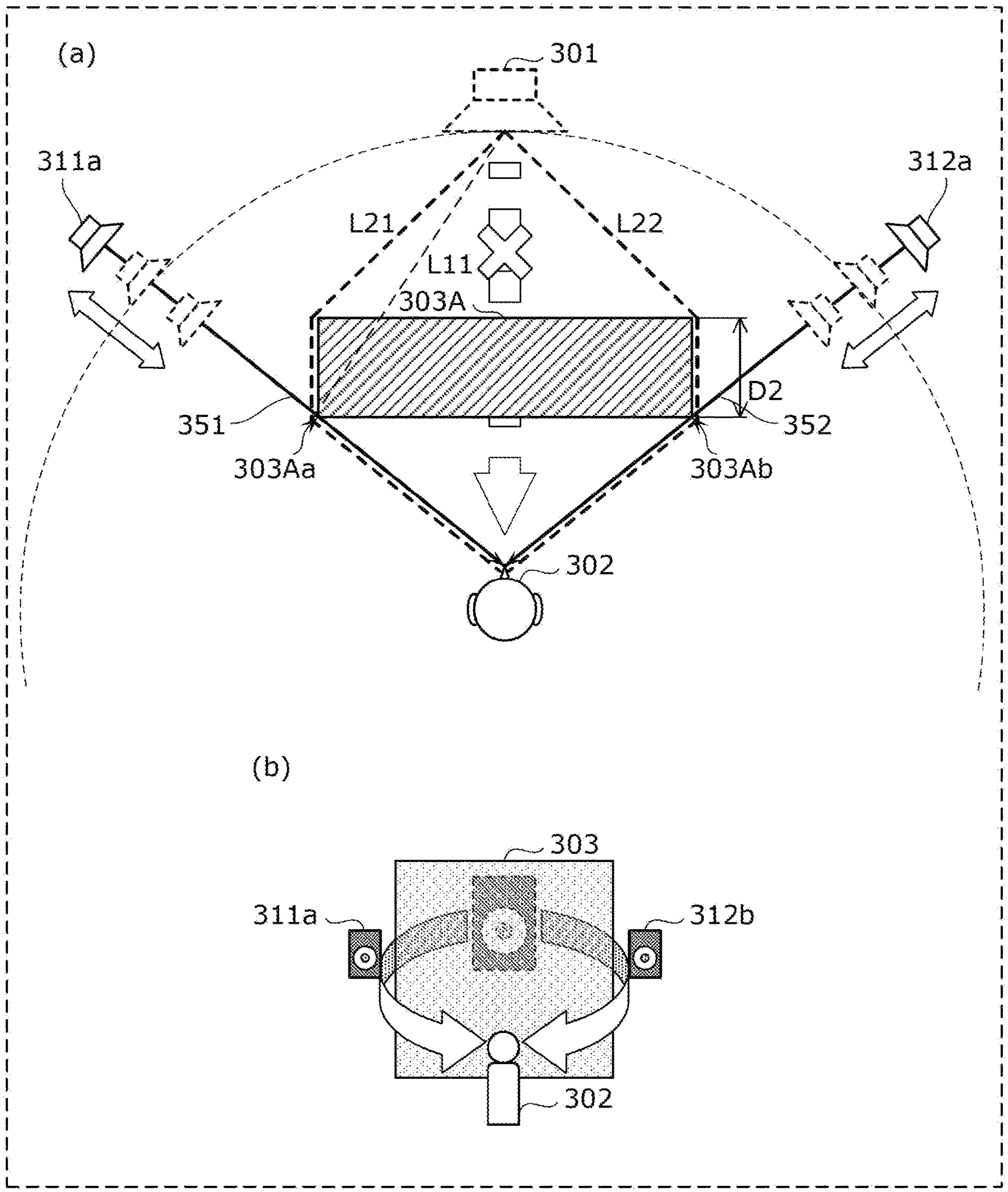
FIG. 5 is a diagram for explaining a second example of the process for generating virtual sound sources when an obstacle is disposed between the sound source and the listener.

FIG. 5 is a diagram for explaining a second example of the process for generating virtual sound sources when an obstacle is disposed between the sound source and the listener. In FIG. 5, (a) is a top plan view of a positional relationship between the sound source and the listener in the virtual space. In FIG. 5, (b) is a three-dimensional diagram illustrating a positional relationship between the sound source and the listener in the virtual space.

Obstacle 303A in the second example differs from obstacle 303 in the first example in width (thickness) in the direction from listener 302 toward sound source 301. Width D2 of obstacle 303A is greater than width D1 of obstacle 303.

As illustrated in FIG. 5, in a similar manner to the first example, in order to simply reproduce the diffracted sound, generator 103 of sound reproduction device 100 generates, in place of sound source 301, two virtual sound sources 311*a* and 312*a* disposed in the neighborhood of two virtual sound source directions 351 and 352 which are from the listening position of listener 302 toward the both ends of obstacle 303A and which correspond to both ends of obstacle 303A. Virtual sound source direction 351 is a direction indicated by a straight line passing through listener 302 and horizontal first end 303Aa of obstacle 303A. Virtual sound source direction 352 is a direction indicated by a straight line passing through listener 302 and horizontal second end 303Ab of obstacle 303A. In FIG. 5, (a) illustrates an example where the length of shortest propagation path L21 of the sound from sound source 301 propagating on the left side of obstacle 303A is equal to the length of shortest propagation path L22 of the sound from sound source 301 propagating on the right side of obstacle 303A.

Propagation paths L22 and L22 are indicated by thick broken lines in (a) of FIG. 5. More specifically, the length from sound source 301 to first end 303Aa on propagation path L21 is equal to the length from sound source 301 to second end 303Ab on propagation path L22. Moreover, the length from first end 303Aa to the listening position of listener 302 on propagation path L21 is equal to the length from second end 303Ab to the listening position of listener 302 on propagation path L22. Accordingly, virtual sound sources 311*a* and 312*a* to be generated are disposed at positions equidistant from the listening position of listener 302 (that is, positions on parts of the circle indicated by the dashed line).

The circle indicated by the dashed line is a circle with a radius that is equal to the distance from the listening position of listener 302 to sound source 301. However, the circle according to the present disclosure is not limited to such an example. The circle may have a radius that is longer than the distance from the listening position to sound source 301, or a radius that is shorter than the distance from the listening position to sound source 301. Since propagation path L11 and propagation path L12 are equal to each other in length, the sound pressure levels of virtual sound sources 311*a* and 312*a* are determined to be equal to each other.

When propagation path L21 and propagation path L22 are different from each other in length, the sound pressure levels of virtual sound sources 311 and 312 are determined to be different from each other. For example, the sound pressure levels of sound sources 311*a* and 312*a* may be determined based on the ratio of the lengths of the propagation paths.

Here, since width D2 of obstacle 303A is greater than width D1 of obstacle 303 in the first example (illustrated in FIG. 4), propagation path L21 in the second example is longer than propagation path L11 in the first example. Accordingly, generator 103 generates virtual sound sources 311*a* and 312*a* at positions further away from the listening position of listener 302 in virtual sound source directions 351 and 352 than the positions of virtual sound sources 311 and 312 in the first example. In other words, when the diffraction points when obstacle 303 is present are identical to the diffraction points when obstacle 303A is present, generator 103 determines the sound pressure levels of the sound heard by listener 302 from virtual sound source directions 351 and 352 indicated by straight lines passing through the listening position of listener 302 and the diffraction points to decrease as the length of each of the propagation paths increases.

For example, generator 103 may adjust the positions of virtual sound sources 311*a* and 312*a* to be further away from the listening position as the length of each propagation path increases. With this, the sound pressure levels of the sound heard by listener 302 from virtual sound source directions 351 and 352 indicated by the straight lines passing through the listening position of listener 302 and the diffraction points are determined to decrease as the length of each propagation paths increases. In this way, generator 103 may adjust the sound pressure level of the sound heard by listener 302 by adjusting the distance to the positions of virtual sound sources 311*a* and 312*a* to be generated, relative to the listening position of listener 302.

Moreover, for example, generator 103 may adjust the sound pressure levels of the sound emitted from virtual sound sources 311*a* and 312*a* to decrease as the length of each propagation paths increases. For example, generator 103 may determine the gain of the sound pressure level of the sound emitted from each of virtual sound sources 311*a* and 312*a* by multiplying ratio L11/L21, obtained by dividing the length of propagation path L11 by the length of propagation path L21, by the gain of the sound pressure level of the sound emitted from each of virtual sound sources 311 and 312. Generator 103 may also determine the gain of the sound pressure level of the sound emitted from each of virtual sound sources 311*a* and 312*a* by multiplying ratio D1/D2, obtained by dividing width D1 of obstacle 303 by width D2 of obstacle 303A, by the gain of the sound pressure level of the sound emitted from each of virtual sound sources 311 and 312. With this, the sound pressure levels of the sound heard by listener 302 from virtual sound source directions 351 and 352, indicated by the straight lines passing through the listening position of listener 302 and the diffraction points, are determined to decrease as the length of each propagation path increases. In such a manner, generator 103 may adjust the sound pressure levels of the sound heard by listener 302, by adjusting the sound pressure levels of the sound emitted from virtual sound sources 311*a* and 312*a*.

Figure 6:
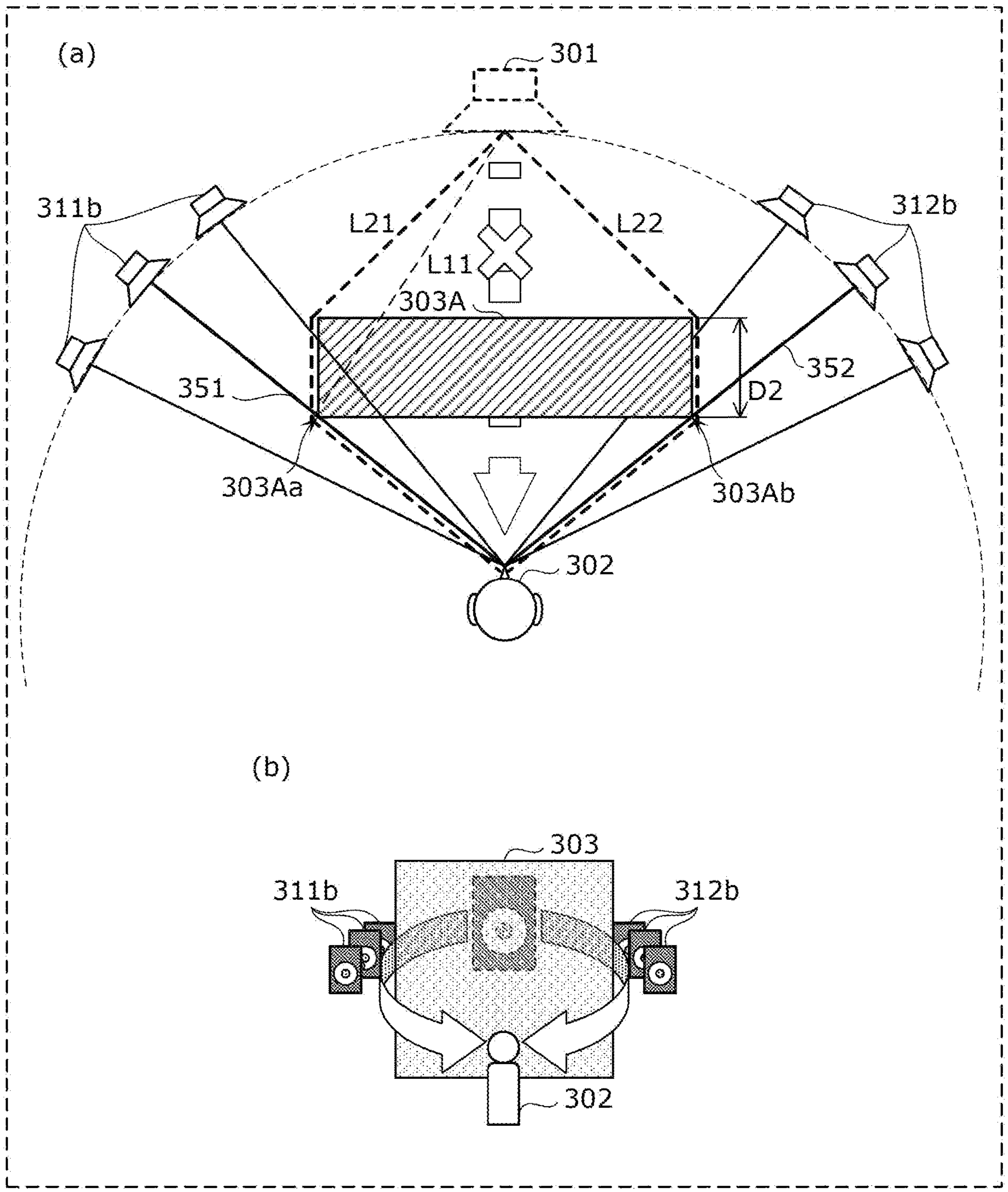
FIG. 6 is a diagram for explaining a third example of the process for generating virtual sound sources when an obstacle is disposed between the sound source and the listener.

FIG. 6 is a diagram for explaining a third example of the process for generating virtual sound sources when an obstacle is disposed between the sound source and the listener. In FIG. 6, (a) is a top plan view illustrating a positional relationship between the sound source and the listener in the virtual space. In FIG. 6, (b) is a three-dimensional diagram illustrating the positional relationship between the sound source and the listener in the virtual space.

The third example is the same scene as the second example. In other words, in the third example, the size and the position of obstacle 303A are the same as those in the second example, and the position of sound source 301 and the listening position of listener 302 are also the same as those in the second example.

In the third example, generator 103 may determine the number of virtual sound sources according to the length of each propagation path. Specifically, generator 103 may generate a plurality of virtual sound sources 311*b* and a plurality of virtual sound sources 312*b* such that the number of virtual sound sources increases as the length of each propagation path increases. Generator 103 generates a plurality of virtual sound sources 311*b* (three virtual sound sources 311*b* in the example of FIG. 6) and a plurality of virtual sound sources 312*b* (three virtual sound sources 312*b* in the example of FIG. 6) at the positions within the angular ranges in the neighborhood of virtual sound source directions 351 and 352. The angular range in the neighborhood of the direction may be, for example, an angular range of ±30 degrees or an angular range of ±45 degrees relative to the reference direction. Note that the plurality of virtual sound sources are only required to be disposed at positions within the angular range in the neighborhood of the reference direction. The virtual sound sources do not have to be disposed on the reference direction. Moreover, the virtual sound sources do not have to be disposed such that the distribution range of the virtual sound sources includes the reference direction.

The virtual sound sources are disposed such that the distribution range of the virtual sound sources includes the reference direction means that the virtual sound sources are disposed with the reference direction interposed therebetween, and that the virtual sound sources are disposed such that one of the line segments formed by connecting the virtual sound sources intersects with the reference direction. For example, generator 103 may determine the number of virtual sound sources to be one when the ratio L21/L11, obtained by dividing the length of propagation path L21 by the length of propagation path L11, is less than a first threshold. Generator 103 may also determine the number of virtual sound sources to be two when the ratio L21/L11 is greater than the first threshold and less than or equal to a second threshold that is greater than the first threshold. Generator 103 may also determine the number of virtual sound sources to be three when the ratio L21/L11 is greater than the second threshold.

Generator 103 may combine the second example and the third example to place a plurality of virtual sound sources. Generator 103 may determine both the sound pressure levels of the sound heard by the listener from virtual sound source directions 351 and 352 and the number of virtual sound sources to be generated, according to the length of each propagation path.

Generator 103 may further determine the frequency characteristics of the sound emitted from the virtual sound sources to be generated. In other words, generator 103 may determine the frequency characteristics of the sound according to the length of each propagation path in addition to the second example, may determine the frequency characteristics of the sound according to the length of each propagation path in addition to the third example, or may determine the frequency characteristics of the sound according to the length of each propagation path in addition to the combination of the second example and the third example. Generator 103 may also determine the frequency characteristics of the sound emitted from virtual sound sources 311 and 312 in the first example according to the length of each propagation path without performing the processes in the second and third examples.

Figure 7:
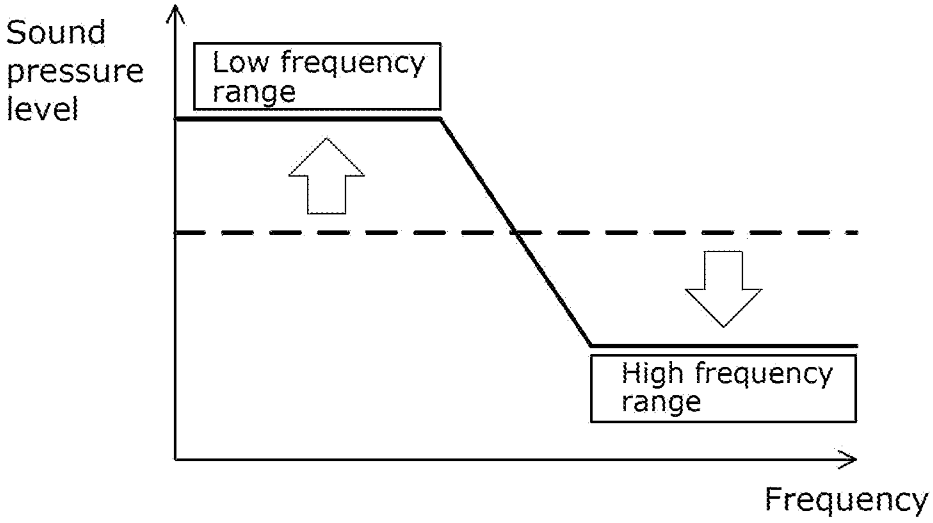
FIG. 7 is a graph indicating a first example of a process for adjusting frequency characteristics of sound emitted from a virtual sound source.
Figure 8:
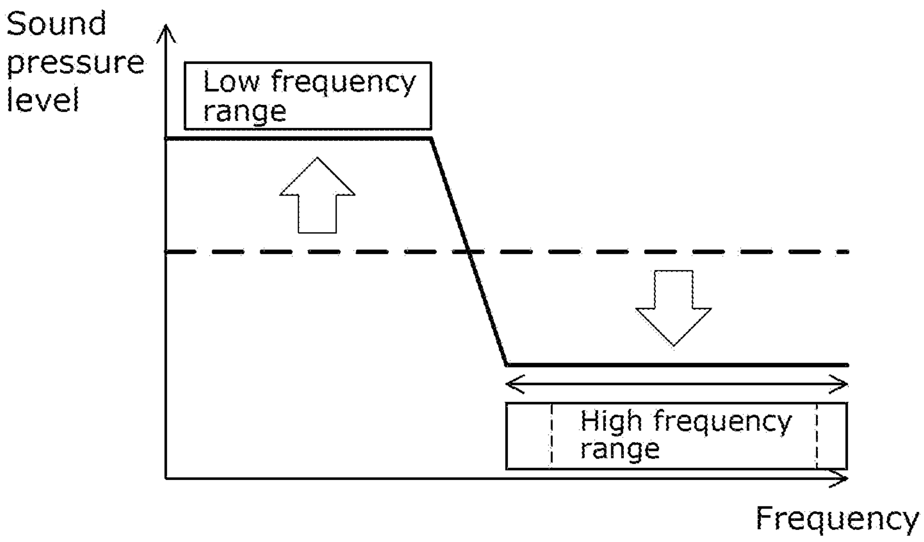
FIG. 8 is a graph indicating a second example of the process for adjusting the frequency characteristics of the sound emitted from the virtual sound source.

FIG. 7 is a graph illustrating a first example of a process for adjusting frequency characteristics of sound emitted from the virtual sound sources. FIG. 8 is a graph illustrating a second example of the process for adjusting frequency characteristics of sound emitted from the virtual sound sources.

As illustrated in FIG. 7, generator 103 may determine the frequency characteristics of the sound emitted from the virtual sound sources to set the sound pressure level in the high frequency range to be relatively lower than the sound pressure level in the low frequency range, as the length of each propagation path increases. Generator 103 may determine the frequency characteristics to decrease the sound pressure level in the high frequency range as the length of each propagation path increases. Generator 103 may also determine the frequency characteristics to increase the sound pressure level in the low frequency range as the length of each propagation path increases. Generator 103 may also determine the frequency characteristics to decrease the sound pressure level in the high frequency range and to increase the sound pressure level in the low frequency range as the length of each propagation path increases. In addition, as illustrated in FIG. 8, generator 103 may further determine the frequency characteristics to increase the bandwidth of the high frequency range for which the sound pressure level is set to be relatively lower than the sound pressure level in the low frequency range as the length of each propagation path increases.

As described above, in the first to third examples, the method of generating the virtual sound sources when two propagation paths are formed with an obstacle interposed therebetween has been described. In this case, the virtual sound sources are arranged in two virtual sound source directions 351 and 352 corresponding to the two propagation paths.

Figure 9:
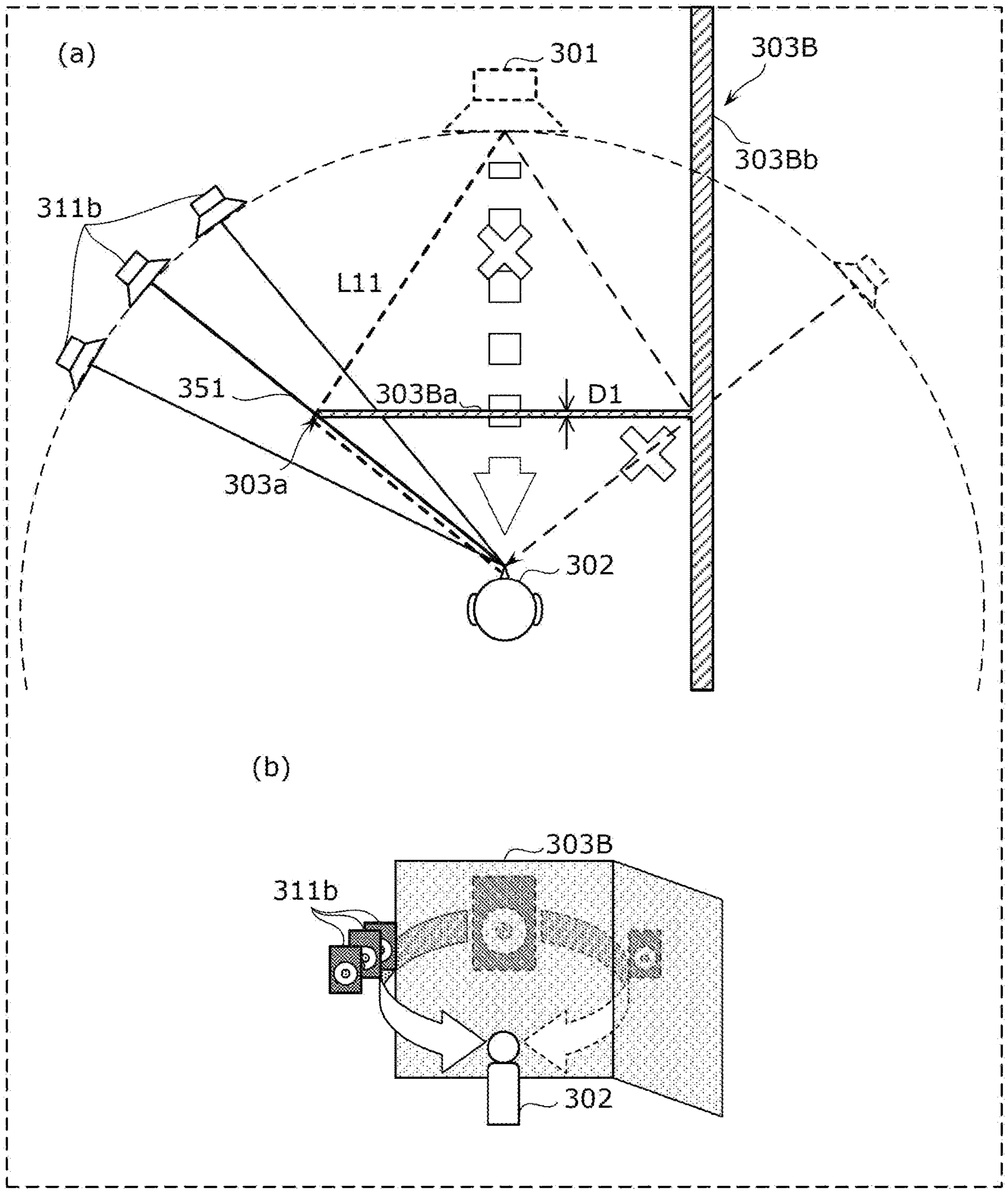
FIG. 9 is a diagram for explaining a fourth example of the process for generating virtual sound sources when an obstacle is disposed between the sound source and the listener.

FIG. 9 is a diagram for explaining a fourth example of the process for generating virtual sound sources when an obstacle is disposed between the sound source and the listener. In FIG. 9, (a) is a top plan view of a positional relationship between the sound source and the listener in the virtual space. In FIG. 9, (b) is a three-dimensional diagram illustrating the positional relationship between the sound source and the listener in the virtual space.

Obstacle 303B in the fourth example differs from obstacle 303 in the first example in that obstacle 303B further includes wall-shaped second portion 303Bb positioned on one side of sound source 301 and listener 302. Obstacle 303B includes first portion 303Ba with the same configuration as obstacle 303 disposed between sound source 301 and listener 302, and second portion 303Bb connected to first portion 303Ba and disposed on the right side of sound source 301 and listener 302. The right side of sound source 301 and listener 302 is one side of first portion 303Ba. Second portion 303Bb is disposed in the direction intersecting with first portion 303Ba, that is, in the direction of a straight line connecting sound source 301 and listener 302. In such a manner, since obstacle 303B in the fourth example includes second portion 303Bb, sound from sound source 301 is blocked by second portion 303Bb of obstacle 303B. Accordingly, one propagation path L11 for the sound from sound source 301 to propagate bypassing obstacle 303B is formed passing only on one side of obstacle 303B. In this case, generator 103 generates a plurality of virtual sound sources 311*b* to be disposed in only single virtual sound source direction 351 corresponding to single propagation path L11.

The case where one propagation path is formed passing only on one side of the obstacle means that the obstacle includes a first portion disposed between sound source 301 and listener 302 and a second portion connected to the first portion and disposed on one side of at least one of sound source 301 or listener 302.

Next, a specific example of a process for detecting an obstacle performed by detector 102 will be described.

Figure 10:
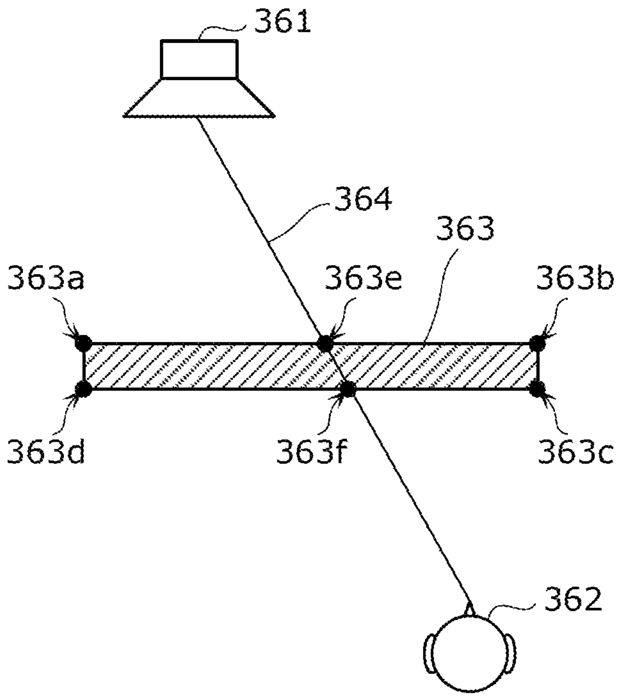
FIG. 10 is a diagram for explaining a first example of a process for detecting an obstacle.

FIG. 10 is a diagram for explaining a first example of a process for detecting an obstacle. FIG. 10 is a top plan view of a positional relationship between the sound source and the listener in the virtual space.

FIG. 10 illustrates structure 363 rectangular in shape when viewed from above. In other words, structure 363 includes four corners 363*a* to 363*d* when viewed from above. Structure 363 includes four sides connecting four corners 363*a* to 363*d*. Since the positions of four corners 363*a* to 363*d* are indicated by spatial information, detector 102 determines whether or not line segment 364 connecting sound source 361 and the listening position of listener 362 intersects with any one of the four sides of structure 363 or whether or not line segment 364 is in contact with any one of four corners 363*a* to 363*d*. Detector 102 detects structure 363 as an obstacle when determining that line segment 364 intersects with any one of the four sides of structure 363 or is in contact with any one of four corners 363*a* to 363*d*.

Moreover, detector 102 may detect, as diffraction points, two corners 363*c* and 363*d* at both ends of the side which includes point 363*f* closer to listener 362 among points 363*e* and 363*f* where line segment 364 intersects with any ones of the four sides. Alternatively, detector 102 may detect, as diffraction points, two corners 363*c* and 363*d* on the two outermost line segments among the four line segments connecting the listening position of listener 362 and each of four corners 363*a* to 363*d*.

Figure 11:
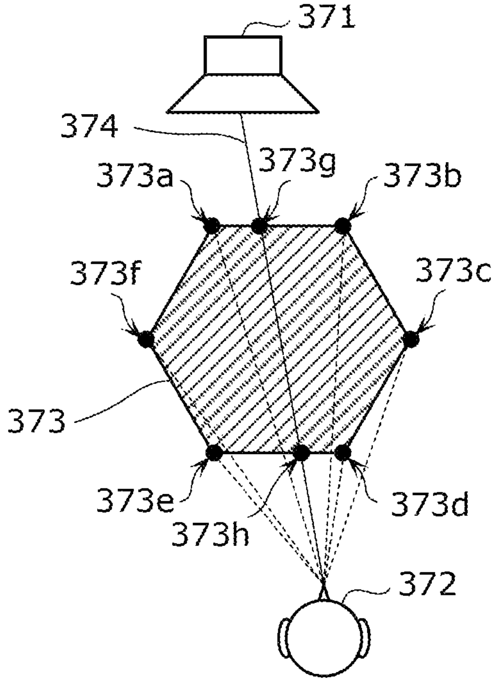
FIG. 11 is a diagram for explaining a second example of the process for detecting an obstacle.

FIG. 11 is a diagram for explaining a second example of the process for detecting an obstacle. FIG. 11 is a top plan view of a positional relationship between the sound source and the listener in the virtual space.

FIG. 11 illustrates structure 373 hexagonal in shape when viewed from above. In other words, structure 373 includes six corners 373*a* to 373*f* when viewed from above, and includes six sides connecting six corners 373*a* to 373*f*. Since the positions of six corners 373*a* to 373*f* are indicated by spatial information, detector 102 determines whether or not line segment 374 connecting sound source 371 and the listening position of listener 372 intersects with any one of the six sides of structure 373 or whether or not line segment 374 is in contact with any one of six corners 373*a* to 373*f*. Detector 102 detects structure 373 as an obstacle when determining that line segment 374 intersects with any one of the six sides of structure 373 or is in contact with any one of six corners 373*a* to 373*f*.

Moreover, detector 102 may detect, as diffraction points, two corners 373*d* and 373*e* at both ends of the side which includes point 373*h* closer to listener 372 among points 373*g* and 373*h* where line segment 374 intersects with any ones of four sides. Alternatively, detector 102 may detect, as diffraction points, two corners 373*c* and 373*e* on the two outermost line segments among the six line segments connecting the listening position of listener 372 and each of six corners 373*a* to 373*f*.

In each of FIG. 10 and FIG. 11, for the sake of simplicity of explanation, an obstacle is detected using the sides connecting the corners of polygonal obstacles.

However, the sides for detecting an obstacle are not limited to the sides connecting the corners, but may be the sides connecting given points set on the surfaces of the obstacle.

2. Operation

Next, an operation of sound reproduction device 100, that is, a sound reproduction method executed by sound reproduction device 100 will be described.

Figure 12:
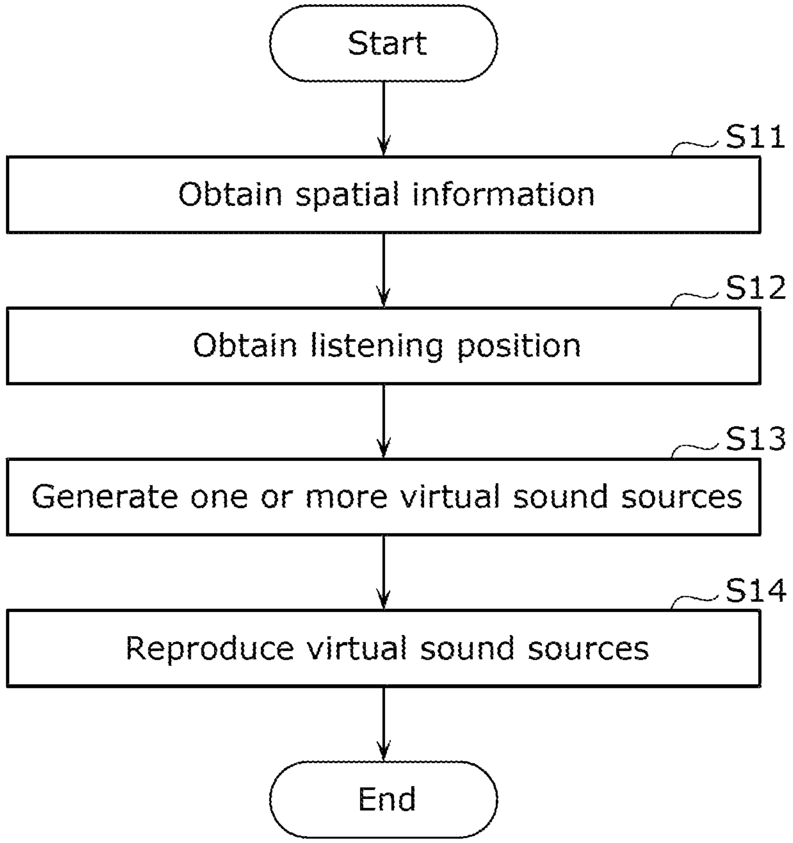
FIG. 12 is a flowchart illustrating an example of an operation of a sound reproduction device.

FIG. 12 is a flowchart illustrating an example of an operation of a sound reproduction device.

Sound reproduction device 100 obtains spatial information (S11). The spatial information is information for reproducing a virtual space. The virtual space includes a structure and a sound source in the virtual space.

Next, sound reproduction device 100 identifies the listening position of the listener in the virtual space (S12).

Next, sound reproduction device 100 generates one or more virtual sound sources (S13). When a structure is disposed between the sound source and the listening position in the virtual space, the one or more virtual sound sources are disposed in the neighborhood of one or more virtual sound source directions from the listening position toward one or more ends of the structure.

Next, sound reproduction device 100 reproduces the generated one or more virtual sound sources, and outputs the obtained audio stream to terminal 200 (S14).

3. Advantageous Effects, Etc

Sound reproduction device 100 according to the present embodiment obtains spatial information for reproducing a virtual space. The virtual space includes a structure and a sound source. Next, sound reproduction device 100 identifies the listening position of the listener in the virtual space. When a structure is disposed between the sound source and the listening position in the virtual space, sound reproduction device 100 then generates one or more virtual sound sources disposed in the neighborhood of one or more virtual sound source directions from the listening position toward one or more ends of the structure. The generating includes determining the one or more virtual sound sources based on a length of a propagation path of the sound from the sound source and the listener, the propagation path bypassing the structure. The determining includes determining at least one of (i) a sound pressure level of sound heard by the listener from the one or more virtual sound source directions, (ii) a total number of the one or more virtual sound sources, or (iii) a frequency characteristic of sound emitted from the one or more virtual sound sources.

With this, one or more virtual sound sources, for which the sound pressure level, the number of virtual sound sources to be generated, and the frequency characteristics are determined, are generated based on the length of each propagation path, so that the sound heard by the listener when a structure is disposed between the sound source and the listener in the virtual space is reproduced. Accordingly, it is possible to reduce the processing load required for reproducing 3D audio.

Moreover, in sound reproduction device 100 according to the present embodiment, the sound pressure level is determined by adjusting a sound pressure level of the sound emitted from the one or more virtual sound sources to decrease as the length of the propagation path increases. In other words, sound reproduction 100 is capable of generating one or more virtual sound sources such that the sound pressure level of the sound is attenuated as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, in sound reproduction device 100 according to the present embodiment, it may be that the sound pressure level is determined by adjusting the position of each of the one or more virtual sound sources to be further away from the listening position as the length of the propagation path increases. In other words, sound reproduction device 100 is capable of generating one or more virtual sound sources for which the sound pressure level is determined according to the length of each propagation path. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, in sound reproduction device 100 according to the present embodiment, the number of one or more virtual sound sources is determined to increase as the length of the propagation path increases. With this, it is possible to generate one or more virtual sound sources determined such that the sound spreads more due to the influence of diffraction as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, in sound reproduction device 100 according to the present embodiment, the frequency characteristic is determined to set the sound pressure level in a high frequency range to be relatively lower than the sound pressure level in a low frequency range as the length of the propagation path increases. With this, it is possible to generate one or more virtual sound sources which are determined to reproduce the phenomenon where the sound pressure level in the high frequency range decreases due to the influence of diffraction as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, in sound reproduction device 100 according to the present embodiment, the frequency characteristic is adjusted to increase a bandwidth of the high frequency range in which the sound pressure level is set to be relatively lower, as the length of the propagation path increases. With this, it is possible to generate one or more virtual sound sources which are determined to reproduce the phenomenon where the sound pressure level in the high frequency range decreases due to the influence of diffraction as the length of the propagation path increases. Accordingly, it is possible to reduce the processing load required for reproducing 3D audio, and to reproduce appropriate 3D audio which hardly affects the impressions of the sound heard by the listener before and after a plurality of virtual sound sources are disposed in place of the sound source.

Moreover, in sound reproduction device 100 according to the present embodiment, when two propagation paths, each of which is the propagation path, are formed with the structure interposed therebetween, the one or more virtual sound sources are disposed in each of two virtual sound source directions corresponding to the two propagation paths With this, since one or more virtual sound sources are disposed for each of two propagation paths, it is possible to reproduce appropriate 3D audio which hardly affects the impressions of the sound heard by the listener before and after a plurality of virtual sound sources are disposed in place of the sound source.

Moreover, in sound reproduction device 100 according to the present embodiment, when a single propagation path, which is the propagation path, is formed passing only on one side of the structure, the one or more virtual sound sources are disposed only in a single virtual sound source direction corresponding to the single propagation path. Moreover, the one or more virtual sound sources are plural in number. With this, a plurality of virtual sound sources are disposed which are determined such that the sound spreads due to the influence of diffraction when one of two propagation paths is blocked. Accordingly, it is possible to reproduce appropriate 3D audio which hardly affects the impressions of the sound heard by the listener before and after a plurality of virtual sound sources are disposed in place of the sound source.

4. Variations (1) In the above embodiment, it has been described that sound reproduction device 100 adjusts one or more virtual sound sources to be generated, according to the length of each propagation path. Specifically, it has been described that sound reproduction device 100 adjusts at least one of: the sound pressure levels of the sound heard by the listener from one or more virtual sound source directions; the number of virtual sound sources; and the frequency characteristics of the sound emitted from the virtual sound sources (hereinafter, referred to as parameters of the virtual sound sources). However, the present disclosure is not limited to such an example. Sound reproduction device 100 stores, in memory, relation information such as tables in which a plurality of positional relationships respectively indicating presumed relationships between the sound source, the structure, and the listening position, are associated with the parameters of the virtual sound sources calculated in advance corresponding to the plurality of positional relationships. Sound reproduction device 100 may then determine the parameters of the virtual sound sources associated with the positional relationship corresponding to the obtained listening position by referring to the relation information. In other words, sound reproduction device 100 does not have to calculate the parameters of the virtual sound sources in real time according to the listening position, and may extract and identify the parameters of the virtual sound sources that have been calculated and determined in advance from the memory. This further reduces the processing load for generating the virtual sound sources.

(2) In the above embodiment, it has been described that terminal 200 includes detector 203, input receiver 204, display unit 205, and sound output unit 206. However, the present disclosure is not limited to such an example. It may be that the sound reproduction device includes the same functions as detector 203, input receiver 204, display unit 205 and sound output unit 206.

Other Embodiments, Etc

Although the present disclosure has been described above based on the above embodiment, the present disclosure is of course not limited to the above embodiment. The following cases are also included in the present disclosure.

(1) Each device in the embodiment described above is specifically a computer system including a microprocessor, a read only memory (ROM), a random access memory (RAM), a hard disk unit, a display unit, a keyboard, a mouse and the like. The RAM or the hard disk unit stores a computer program. Each device achieves its function by the microprocessor operating according to the computer program. Here, a computer program is formed of combinations of instruction codes indicating commands to a computer to achieve a predetermined function.

(2) Part or all of the structural elements included in each device in the embodiment described above may be configured by a single system large scale integration (LSI). The system LSI is an ultra-multifunctional LSI manufactured by integrating a plurality of structural elements on a single chip, and specifically, is a computer system including a microprocessor, a ROM, a RAM and the like. A computer program is stored in the RAM. The system LSI achieves its function by the microprocessor operating according to the computer program.

Moreover, each of the structural elements included in each of the above-described devices may be individually made into a single chip, or may be made into a single chip so as to include part or all of the structural element.

Although the term "system LSI" is used here, it may be called IC, LSI, super LSI, or ultra LSI depending on the degree of integration. The method of circuit integration is not limited to LSI, and may be realized by a dedicated circuit or a general-purpose processor. A field programmable gate array (FPGA) that can be programmed after the LSI is manufactured, or a reconfigurable processor that can reconfigure the connection and setting of circuit cells inside the LSI may be used.

Moreover, if an integrated circuit technology comes out to replace LSI as a result of the advancement of semiconductor technology or a derivative other technology, it is naturally also possible to carry out function block integration using such a technology. Adaption of biotechnology, for example, is a possibility.

(3) Part or all of the structural elements included in each of the above devices may be configured with an integrated circuit (IC) card removable from each device or a single module. The IC card or the module is a computer system including a microprocessor, a ROM, a RAM, and the like. The IC card or the module may include the above-mentioned super-multifunctional LSI. The IC card or the module achieves its function by the microprocessor operating according to the computer program. The IC card or the module may be tamper resistant.

(4) The present disclosure may be implemented by the method described above. Moreover, the method may be a computer program implemented by a computer or a digital signal configured from the computer program.

Moreover, the present disclosure may be a computer program or a digital signal recorded on a computer-readable recording medium, such as a flexible disk, a hard disk, a compact disc (CD)-ROM, a MO, a DVD, a DVD-ROM, a DVD-RAM, a BD (Blu-ray (registered trademark) Disc), and a semiconductor memory. Moreover, it may be the digital signal recorded on these recording media.

Moreover, the present disclosure may transmit the computer program or digital signal via an electronic communication line, a wireless or wired communication line, a network represented by the Internet, a data broadcast, and the like.

Moreover, it may be that the present disclosure is implemented by a computer system including a microprocessor and a memory, the computer program is recorded in the memory, and the microprocessor operates according to the computer program.

Moreover, the program or the digital signal may be recorded on a recording medium and transferred, or the program or the digital signal may be transferred via the network or the like to be implemented by another independent computer system.

(5) The embodiment and the variations described above may be combined.

INDUSTRIAL APPLICABILITY

The present disclosure is applicable to a sound reproduction method, a sound reproduction device, a recording medium, and the like that are capable of reducing the processing load required for reproducing 3D audio.

The invention claimed is:

1. A sound reproduction method comprising:

obtaining spatial information including information about each of a structure and a sound source disposed in a virtual space;

obtaining acoustic information including an audio signal indicating sound by the sound source disposed in the virtual space, information about the virtual space, and second spatial information including position information of the sound source and the structure disposed in the space;

identifying a listening position of a listener in the virtual space;

determining, when the structure is disposed between the sound source and the listening position in the virtual space, at least one of (i) a sound pressure level of sound to be heard by the listener from each of one or more sound source directions, (ii) a total number of one or more sound sources, or (iii) a frequency characteristic of sound emitted from the one or more sound sources, based on a length of a propagation path bypassing the structure, the propagation path being a propagation path of the sound from the sound source to the listener; and in order to reproduce diffraction sound of the sound source, generating one or more virtual sound sources that are disposed in a neighborhood on one or more directions from the listening position toward one or more ends of the structure, and generating an audio stream for output using a head-related transfer function according to the one or more virtual sound sources generated and the listening position of the listener, wherein the total number of the one or more sound sources is determined to increase as the length of the propagation path increases.

2. The sound reproduction method according to claim 1, wherein the sound pressure level is determined by adjusting a sound pressure level of the sound emitted from the one or more sound sources to decrease as the length of the propagation path increases.

3. The sound reproduction method according to claim 1, wherein the sound pressure level is determined by adjusting a position of each of the one or more sound sources to be further away from the listening position as the length of the propagation path increases.

4. The sound reproduction method according to claim 1, wherein the frequency characteristic is determined to set a sound pressure level in a high frequency range to be relatively lower than a sound pressure level in a low frequency range as the length of the propagation path increases.

5. The sound reproduction method according to claim 4, wherein the frequency characteristic is adjusted to increase a bandwidth of the high frequency range in which the sound pressure level is set to be relatively lower than the sound pressure level in the low frequency range, as the length of the propagation path increases.

6. The sound reproduction method according to claim 1, wherein, when two propagation paths, each of which is the propagation path, are formed with the structure interposed therebetween, the one or more sound sources are disposed in each of two sound source directions corresponding to the two propagation paths.

7. The sound reproduction method according to claim 1, wherein, when a single propagation path, which is the propagation path, is formed passing only on one side of the structure, the one or more sound sources are disposed only in a single sound source direction corresponding to the single propagation path, and the one or more sound sources are plural in number.

8. The sound reproduction method according to claim 1, wherein the neighborhood includes an angular range of ±45 degrees with respect to the sound source direction.

9. The sound reproduction method according to claim 1, wherein the information about the structure includes shape information and position information about the structure; and the length of the propagation path is specified based on the shape information, the position information, and the listening position.

10. The sound reproduction method according to claim 9, wherein the shape information includes information indicating a thickness of the structure; and in the determining, the propagation path is set to be longer as the thickness is larger.

11. The sound reproduction method according to claim 1, further comprising:

detecting a change in the listening position; and adjusting at least one of the sound pressure level, the total number of the one or more sound sources, or the frequency characteristic based on the change.

12. The sound reproduction method according to claim 11, wherein the change in the listening position is detected by obtaining sensor information indicating the position of the listener at a regular time interval.

13. The sound reproduction method according to claim 11, wherein the change in the listening position is detected based on input information indicating the position of the listener.

14. A sound reproduction device comprising:

a spatial information obtainer which obtains spatial information including information about each of a structure and a sound source disposed in a virtual space;

an acoustic information obtainer which obtains acoustic information including an audio signal indicating sound by the sound source disposed in the virtual space, information about the virtual space, and second spatial information including position information of the sound source and the structure disposed in the space;

an identifier which identifies a listening position of a listener in the virtual space; and a generator which determines, when the structure is disposed between the sound source and the listening position in the virtual space, at least one of (i) a sound pressure level of sound to be heard by the listener from each of one or more sound source directions, (ii) a total number of one or more sound sources, or (iii) a frequency characteristic of sound emitted from the one or more sound sources, based on a length of a propagation path bypassing the structure, the propagation path being a propagation path of the sound from the sound source to the listener, and in order to reproduce diffraction sound of the sound source, generates one or more virtual sound sources that are disposed in a neighborhood on one or more directions from the listening position toward one or more ends of the structure, and generates an audio stream for output using a head-related transfer function according to the one or more virtual sound sources generated and the listening position of the listener, wherein the total number of the one or more sound sources is determined to increase as the length of the propagation path increases.

15. A non-transitory computer-readable recording medium having recorded thereon a program for causing a computer to execute a sound reproduction method, the sound reproduction method comprising:

obtaining spatial information including information about each of a structure and a sound source disposed in a virtual space;

obtaining acoustic information including an audio signal indicating sound by the sound source disposed in the virtual space, information about the virtual space, and second spatial information including position information of the sound source and the structure disposed in the space;

identifying a listening position of a listener in the virtual space;

determining, when the structure is disposed between the sound source and the listening position in the virtual space, at least one of (i) a sound pressure level of sound to be heard by the listener from each of one or more sound source directions, (ii) a total number of one or more sound sources, or (iii) a frequency characteristic of sound emitted from the one or more sound sources, based on a length of a propagation path bypassing the structure, the propagation path being a propagation path of the sound from the sound source to the listener;

in order to reproduce diffraction sound of the sound source, generating one or more virtual sound sources that are disposed in a neighborhood on one or more directions from the listening position toward one or more ends of the structure, and generating an audio stream for output using a head-related transfer function according to the one or more virtual sound sources generated and the listening position of the listener, wherein the total number of the one or more sound sources is determined to increase as the length of the propagation path increases.

* * * * *